(12) United States Patent
Webster et al.

(10) Patent No.: US 10,909,566 B2
(45) Date of Patent: ***Feb. 2, 2021

(54) SYSTEMS AND METHODS FOR UTILIZING TONES

(71) Applicant: Nicholas-Alexander, LLC, Tracy, CA (US)

(72) Inventors: Thomas Webster, Tracy, CA (US); James Blommel, Dayton, OH (US); James M. Salzarulo, Covington, KY (US)

(73) Assignee: NICHOLAS-ALEXANDER, LLC, Las Vegas, NV (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/880,709

(22) Filed: Oct. 12, 2015

(65) Prior Publication Data

US 2016/0104190 A1    Apr. 14, 2016

Related U.S. Application Data

(60) Provisional application No. 62/062,421, filed on Oct. 10, 2014.

(51) Int. Cl.
*G06Q 30/00* (2012.01)
*G06Q 30/02* (2012.01)
(Continued)

(52) U.S. Cl.
CPC ........... *G06Q 30/0241* (2013.01); *G06F 9/44* (2013.01); *H04L 65/4076* (2013.01); *G10L 19/018* (2013.01)

(58) Field of Classification Search
CPC .. G06Q 30/0241; G06Q 30/0185; G06F 9/44; H04L 65/4076; G10L 19/018; H04N 21/4627; H04N 21/4524
See application file for complete search history.

(56) References Cited

U.S. PATENT DOCUMENTS 7,243,362 B2 *    7/2007    Swix ...................... H04H 20/10
                                                                 348/E7.063
7,853,124 B2 *    12/2010    Ramaswamy ..... H04N 21/4347
                                                                        386/239

(Continued)

OTHER PUBLICATIONS

Streetlights and Shadows, MIT Press, 2009, pp. 33-47.*
(Continued)

*Primary Examiner* — Waseem Ashraf
*Assistant Examiner* — Michael I Ezewoko
(74) *Attorney, Agent, or Firm* — Dinsmore & Shohl LLP

(57) ABSTRACT

Systems and methods for utilizing tones are disclosed. A method of receiving tones may include receiving content for broadcast to a recipient computing device, receiving data for including with the content, where the data includes an instruction for the recipient computing device to perform in response to detecting the data, and converting the data into an inaudible tone for inclusion with the content. The method may also include determining a location within the content to include the inaudible tone, incorporating the inaudible tone into the content at the location, such that the inaudible tone and the content and broadcast to the recipient computing device, and providing the inaudible tone and content for broadcast.

20 Claims, 4 Drawing Sheets

(51) Int. Cl.
    *H04L 29/06*     (2006.01)
    *G06F 9/44*     (2018.01)
    *G10L 19/018*     (2013.01)

(56) References Cited

U.S. PATENT DOCUMENTS

| | | | |
|---|---|---|---|
| 7,930,714 B2* | 4/2011 | Konig | G06K 9/00744 |
| | | | 725/32 |
| 9,264,151 B1* | 2/2016 | Emigh | G06Q 30/0211 |
| 9,401,153 B2* | 7/2016 | Sharma | G10L 19/018 |
| 9,712,474 B2* | 7/2017 | Xie | H04L 51/20 |
| 9,886,696 B2* | 2/2018 | Roeding | G06Q 30/0214 |
| 9,996,413 B2* | 6/2018 | Dhuse | G06F 11/1004 |
| 2012/0197648 A1* | 8/2012 | Moloney | G10L 19/018 |
| | | | 704/500 |
| 2013/0204413 A1* | 8/2013 | Gehani | G11B 27/28 |
| | | | 700/94 |

OTHER PUBLICATIONS

The future of the internet—and how to stop It, Yale University Press, 2008, Chapter(s) 1-9, [emphasis pp. 11-18].*
Algorithms + Data Structures = Programs, 1974, pp. xii-55.*
Social Life, John Wiley & Sons, 2012, pp. 57-80.*

* cited by examiner

FIG. 3A

WEBSITE FLOW CHART (OUTLINE)

THE TONE KNOWS
CLIENT LOGIN
PASSWORD

FIG. 3H

OPEN / REVISE PREVIOUS
SELECT ONE:

| PROJECT # | DATE | TITLE | ISCI CODE |
|---|---|---|---|
| 0004133 | 01-01-15 | PAMPERS 1 | DBS50T01 |
| 0012213 | 03-12-14 | CREST 1 | CRS32T01 |
| 0012729 | 03-14-14 | CREST 2 | CRS33T02 |
| 0012999 | 02-25-14 | PAMPERS 2 | DBS51T02 |

ENTER    BACK

FIG. 3B

WELCOME (NAME)
WOULD YOU LIKE TO:

GO TO DOWNLOADS    LOGOUT
OPEN PREVIOUS PROJECT    START NEW PROJECT

REVISE    START NEW

FIG. 3C

START NEW PROJECT
PROJECT TITLE: _____
PROJECT NUMBER: (AUTO GENERATED)
UPLOAD MEDIA:
SAM-R-13130    BROWSE
ENTER    BACK

FIG. 3D

TONE LOCATIONS
AUTO    MANUAL
TONE:
0  5  10  15  20  25  30
ADD SECOND TONE ?    YES ☒
TONE 2 (ONLY IF YES BOX IS SELECTED)  NO ☐
0  5  10  15  20  25  30
DONE    BACK

FIG. 3E

ASSOCIATED MESSAGE
TONE 1    FILE NAME    BROWSE
ACTION
☒ SEND OFFER IMMEDIATELY
☐ SEND OFFER AFTER 5 HITS
☐ STORE INFO IN DATABASE
ACTIVE DATES:
START __/__/__
END __/__/__
(TONE 2 SAME AS ABOVE)
DONE    BACK

FIG. 3F

PROCESSING MEDIA FILE
0%    75%    100%

FIG. 3G

NEW!

DOWNLOADS PAGE

| PROJECT # | DATE | TITLE | ISCI CODE |
|---|---|---|---|
| 0004133 | 01-01-15 | PAMPERS 1 | DBS50T01 |
|  |  |  |  |
|  |  |  |  |

SAVE AS
RETURN TO MAIN
LOG OUT

JBB 06-2-14

SYSTEMS AND METHODS FOR UTILIZING TONES

CROSS REFERENCE

This application claims the benefit of U.S. Provisional Application Ser. No. 62/062,421, filed Oct. 10, 2014, which is incorporated by reference in its entirety.

BACKGROUND

Field

Embodiments provided herein generally relate systems and methods for utilizing tones, and particularly to transmitting tones within broadcast content for utilization in advertising.

Technical Background

While many advertisers wish to reach consumers in a plurality of different media, oftentimes commercials become invasive to the user experience of providing the audio and/or video content. As an example, if a user visits a website, he/she is often bombarded with banner advertisements, popup advertisements, etc. Similarly, much of the broadcast audio content is often riddled with advertisements before, during, and after the audio content (such as a song, radio program etc.). Accordingly, advertisers are searching for new ways to reach consumers without degrading the consumer experience of the content.

SUMMARY

Systems and methods for utilizing tones are disclosed. A method of receiving tones may include receiving content for broadcast to a recipient computing device, receiving data for including with the content, where the data includes an instruction for the recipient computing device to perform in response to detecting the data, and converting the data into an inaudible tone for inclusion with the content. The method may also include determining a location within the content to include the inaudible tone, incorporating the inaudible tone into the content at the location, such that the inaudible tone and the content and broadcast to the recipient computing device, and providing the inaudible tone and content for broadcast.

Also included are systems for utilizing tones. The system may include a recipient computing device that includes a processor and a memory component that stores logic that, when executed by the processor, causes the system to receive an audio signal, where the audio signal includes content, determine whether the received audio signal includes a tone, and in response to determining that the audio signal includes a tone, determine data provided in the tone. In some embodiments the logic causes the system to utilize the data to perform an action, where the action includes at least one of the following: launch an application, launch a website, and launch a widget.

Also included are embodiments of transitory computer-readable medium for utilizing tones. The non-transitory computer-readable medium may store logic that, when executed by a computing device, causes the computing device to receive content for broadcast to a recipient computing device, receive the data for including with the content, where the data includes an instruction for the recipient computing device to perform in response to detecting the data, and convert the data into a tone for inclusion with the content. In some embodiments, the logic causes the computing device to determine a location within the content to include the tone, incorporate the tone into the content at the location, such that the tone and the content and broadcast to the recipient computing device, and provide the tone and the content for broadcast.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 3A-3H depict user interfaces for creating and/or utilizing a project, according to one or more embodiments described herein;

DETAILED DESCRIPTION

Figure 1:
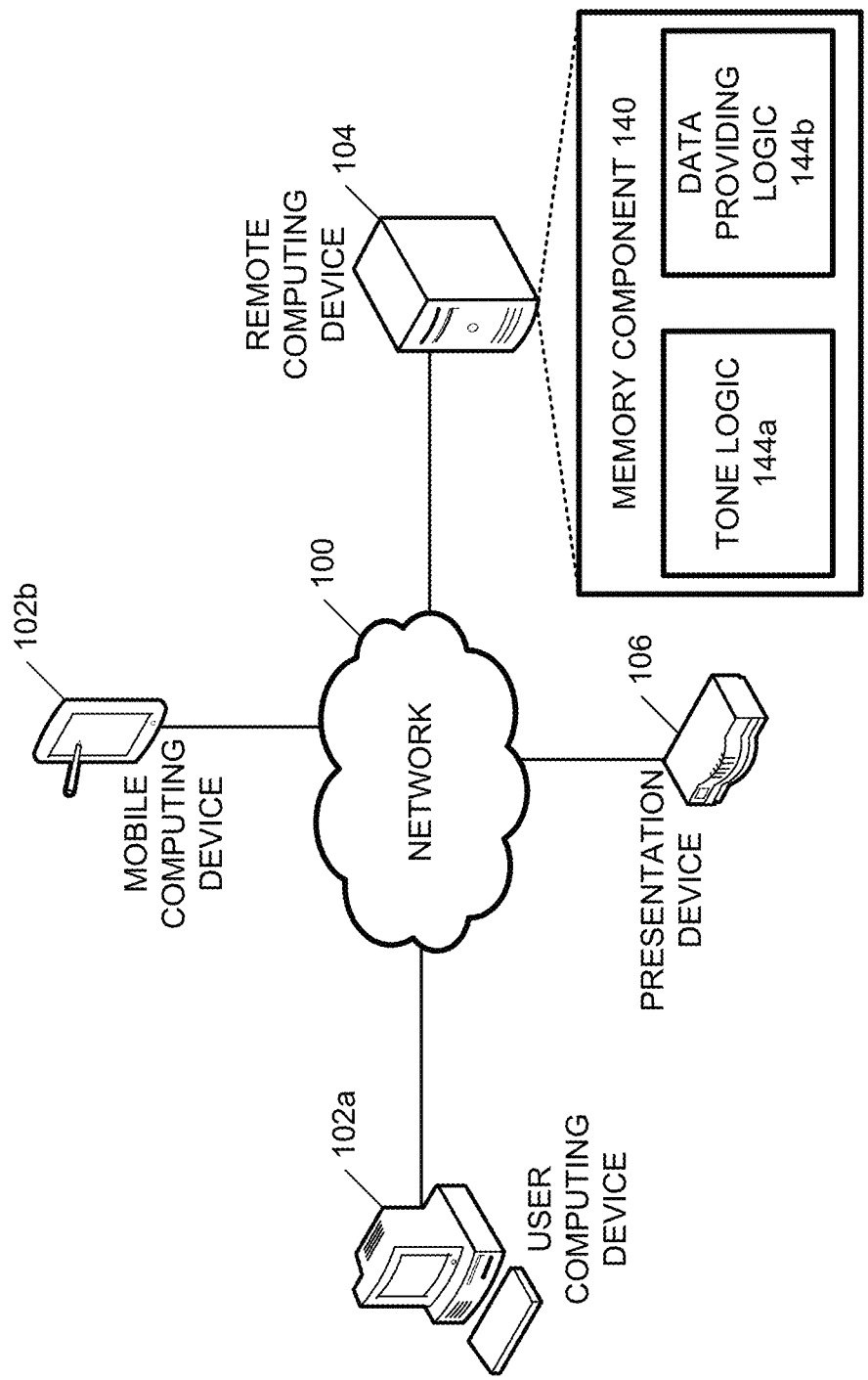
FIG. 1 depicts a computing environment for utilizing tones, according to one or more embodiments shown and described herein.

Embodiments disclosed herein include systems and methods for utilizing tones. Some embodiments are configured to incorporate an inaudible tone (one or more) into content, where the one or more inaudible tones are not perceivable by a human, but are perceivable by a computing device, (such as a mobile device), such that in response to detecting the one or more inaudible tones, the computing device may provide tangential information to the user. The tangential information may include information regarding the content, information regarding a current location of the user, information regarding a product and/or service that the user might have interest, etc.

As an example, the inaudible tones may include one or more frequencies to communicate data. Table 1, below depicts an example pattern for communicating data, such as 0-9 and A-F. A parity bit is also used in Table 1.

TABLE 1

| Data | Pattern |
| --- | --- |
| 0 | 1 0000 |
| 1 | 0 0001 |
| 2 | 0 0010 |
| 3 | 1 0011 |
| 4 | 0 0100 |
| 5 | 1 0101 |
| 6 | 1 0110 |
| 7 | 0 0111 |
| 8 | 0 1000 |
| 9 | 1 1001 |
| A | 1 1010 |
| B | 0 1011 |

TABLE 1-continued

| Data | Pattern |
|---|---|
| C | 1 1100 |
| D | 0 1101 |
| E | 0 1110 |
| F | 1 1111 |

In some embodiments, each bit of the pattern may be represented by a tone pair. As a result, the parity bit and other bits may be represented by a high or low frequency tone. Table 2 illustrates an example of data being communicated, a binary pattern resulting from that data, and which frequencies are used (F1-F10) to communicate that data. Depending on the embodiment, the frequencies may be communicated at different times and/or concurrently.

TABLE 2

| Data | Pattern | F1 | F2 | F3 | F4 | F5 | F6 | F7 | F8 | F9 | F10 |
|---|---|---|---|---|---|---|---|---|---|---|---|
| 0 | 1 0000 |   | X | X |   | X |   | X |   | X |   |
| 1 | 0 0001 | X |   | X |   | X |   | X |   |   | X |
| 2 | 0 0010 | X |   | X |   | X |   |   | X | X |   |
| 3 | 1 0011 |   | X | X |   | X |   |   | X |   | X |
| 4 | 0 0100 | X |   | X |   |   | X | X |   | X |   |
| 5 | 1 0101 |   | X | X |   |   | X | X |   |   | X |
| 6 | 1 0110 |   | X | X |   |   | X |   | X | X |   |
| 7 | 0 0111 | X |   | X |   |   | X |   | X |   | X |
| 8 | 0 1000 | X |   |   | X | X |   | X |   | X |   |
| 9 | 1 1001 |   | X |   | X | X |   | X |   |   | X |
| A | 1 1010 |   | X |   | X | X |   |   | X | X |   |
| B | 0 1011 | X |   |   | X | X |   |   | X |   | X |
| C | 1 1100 |   | X |   | X |   | X | X |   | X |   |
| D | 0 1101 | X |   |   | X |   | X | X |   |   | X |
| E | 0 1110 | X |   |   | X |   | X |   | X | X |   |
| F | 1 1111 |   | X |   | X |   | X |   | X |   | X |

The parity bit may indicate an error in detecting a tone symbol. As a result, other error detection mechanisms may be utilized in conjunction with or in substitution for the parity bit. It should also be understood that a subset of frequencies may be utilized, depending on the data being communicated and the particular embodiment. As an example, Table 3 depicts frequencies to communicate digits 0-7 without parity.

TABLE 3

| Data | Pattern | F5 | F6 | F7 | F8 | F9 | F10 |
|---|---|---|---|---|---|---|---|
| 0 | 000 | X |   | X |   | X |   |
| 1 | 001 | X |   | X |   |   | X |
| 2 | 010 | X |   |   | X | X |   |
| 3 | 011 | X |   |   | X |   | X |
| 4 | 100 |   | X | X |   | X |   |
| 5 | 101 |   | X | X |   |   | X |
| 6 | 110 |   | X |   | X | X |   |
| 7 | 111 |   | X |   | X |   | X |

In some embodiments, the two largest tones may be detected and compared to signal patterns to decide if a tone symbol was detected. This operates sufficiently if there is minimal interference and at least some of the tone signaling energy is received without significant distortion. As these criteria are not often met, a tone detection system may be utilized with fast Fourier Transform (FFT) processing. As an example, if tones are signaled in pairs of discrete frequencies F0, F1, F2, F3, F4, etc., the detection logic may utilize FFT to convert the received audio to the frequency domain. Utilizing a block of samples, "signal_in_time," the FFT converts the audio into "signal_in_frequency" that will include 1024 elements, with signal_in_frequency{i} storing the amplitude of the signal at a frequency of i*44100/1024, where i ranges from 0 to 1023. If each F[j] is picked so that F[j] is k*44100/1024 (a multiple of approximately 43 Hz), the frequency tones should line up with the FFT bins.

Additionally, assuming the system decides that a tone burst exists with the current processing block, the receiving device only needs to look at the energy at F0, F1, F2, etc. A decision may also be made regarding which tone burst was present during the current period. In one embodiment, each tone signal may include (F0 OR F1) AND (F2 OR F3), etc. In this way, the decision may be simplified by determining whether there is more energy in F0 or F1; in F2 or F3. Depending on the set of decisions, the detected signal may be the sum of decisions.

Referring now to the drawings, FIG. 1 depicts a computing environment for utilizing tones, according to one or more embodiments shown and described herein. As illustrated, the computing environment may include a network 100, which may include a wide area network (wired or wireless), such as the internet, a cellular network, or other communications network for communicating devices across a wide area. Additionally, the network 100 may include a wired or wireless local area network for communicating data, as described herein.

Coupled to the network 100 is at least one computing device, such as a user computing device 102a, a mobile computing device 102b (the user computing device 102a and the mobile computing device 102b are collectively referred to herein as "the recipient computing device 102"), and a remote computing device 104. Also coupled to the network 100 is a presentation device 106. The user computing device 102a may be configured for a user to view, create, and/or perceive one or more tones that have been integrated into content. As discussed in more detail below, the user computing device 102a may additionally interface with the remote computing device 104 to for performing this functionality.

Also included is the mobile computing device 102b, which is coupled to the network 100. The mobile computing device 102b may be operated by a consumer or other user and thus may be given different access to the remote computing device 104 than is the user computing device 102a. Accordingly, different login classifications may be granted for administrative users and consumer users. Depending on the embodiment, additional access levels may also be provided.

Also coupled to the network 100 is the presentation device 106. The presentation device 106 may include a radio, television, mobile device, and/or other device of receiving broadcast content and providing the content to a user (such as via terrestrial ratio, terrestrial television, satellite radio, satellite television, internet radio, internet television, etc.). The presentation device 106 may thus receive content from the remote computing device 104 for presentation to the consumer. As will be understood, in some embodiments the presentation device 106 may include a standalone device, such as a television, radio, etc. However, in some embodiments, the presentation device 106 may be configured as an application or may otherwise be integrated into a computing device (such as the user computing device 102a and/or the mobile computing device 102b) or other hardware.

The remote computing device 104 may include a memory component 140 that stores tone logic 144a and data providing logic 144b. The tone logic 144a may include one or more components, such as for generating one or more tones and incorporating the one or more tones into content, such as audio content, video content, etc. The data providing logic 144b may be configured to cause the remote computing device 104 to provide the content data and the tone data to the mobile computing device 102b and/or the user computing device 102a. The data providing logic 144b may further cause the remote computing device 104 to communicate with the user computing device 102a and/or the mobile computing device 102b for creation and/or management of the tone data and content.

It should also be understood that while the remote computing device 104 is depicted as a standalone server in FIG. 1, this is also merely an embodiment. In some embodiments, the remote computing device 104 may be integrated with and/or may otherwise communicate with a radio station, television station, and/or other hardware for presenting the content and tone data to a plurality of consumers and/or devices. Accordingly, the remote computing device 104 may be configured for facilitating broadcast of the content via traditional AM, FM, XM radio stations, over-the-air television stations, internet stations, satellite television stations, etc.

Figure 2:
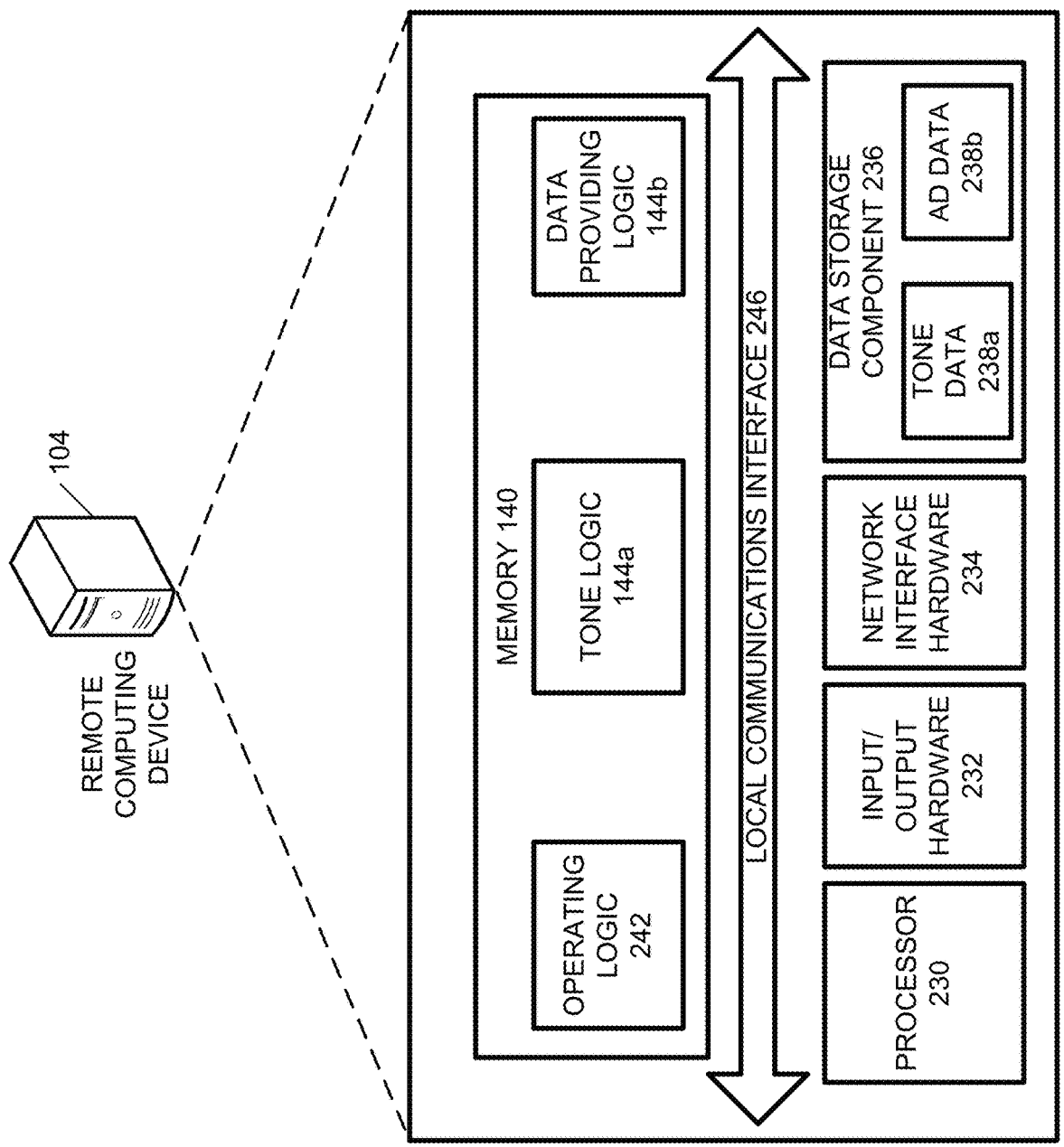
FIG. 2 depicts a remote computing device utilizing tones, according to one or more embodiments shown and described herein.

FIG. 2 depicts a remote computing device 104 utilizing tones, according to one or more embodiments shown and described herein. As illustrated, the remote computing device 104 includes a processor 230, input/output hardware 232, a network interface hardware 234, a data storage component 236 (which stores tone data 238a and/or advertisement data 238b), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the remote computing device 104 and/or external to the remote computing device 104.

The memory component 140 may store operating logic 242, the tone logic 144a, and the data providing logic 144b. Each of these logic components may include a plurality of different pieces of logic, each of which may be embodied as a computer program, firmware, and/or hardware, as an example. A local interface 246 is also included in FIG. 2 and may be implemented as a bus or other communication interface to facilitate communication among the components of the remote computing device 104.

The processor 230 may include any processing component operable to receive and execute instructions (such as from a data storage component 236 and/or the memory component 134). As described above, the input/output hardware 232 may include and/or be configured to interface with the components of FIG. 2.

The network interface hardware 234 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the remote computing device 104 and other computing devices.

The operating logic 242 may include an operating system and/or other software for managing components of the remote computing device 104. As discussed above, the tone logic 144a may reside in the memory component 140 and may be configured to cause the processor 230 to receive commands from the user computing device 102a and/or the mobile computing device 102b to create, edit, and/or otherwise manage tone data and content. The data providing logic 144b may be configured to cause the processor 230 to provide the data to the presentation device 106, user computing device 102a, and/or mobile computing device 102b.

It should be understood that while the components in FIG. 2 are illustrated as residing within the remote computing device 104, this is merely an example. In some embodiments, one or more of the components may reside external to the remote computing device 104 or within other devices, such as those depicted in FIG. 1. It should also be understood that, while the remote computing device 104 is illustrated as a single device, this is also merely an example. In some embodiments, the tone logic 144a and the data providing logic 144b may reside on different computing devices. As an example, one or more of the functionalities and/or components described herein may be provided by the user computing device 102a, the mobile computing device 102b, and/or the remote computing device 104. As an example, the user computing device 102a and/or the mobile computing device 102b may have similar components as those depicted in FIG. 2. To this end the user computing device 102a and/or the mobile computing device 102b may include logic for performing the functionality described herein.

Additionally, while the remote computing device 104 is illustrated with the tone logic 144a and the data providing logic 144b as separate logical components, this is also an example. In some embodiments, a single piece of logic may provide the described functionality. It should also be understood that while the tone logic 144a and the data providing logic 144b are described herein as the logical components, this is also an example. Other components may also be included, depending on the embodiment.

FIGS. 3A-3H depict user interfaces for creating and/or utilizing a project, according to one or more embodiments described herein. As illustrated, FIG. 3A depicts a login interface for accessing a website. FIG. 3B depicts a welcome interface that includes a go to downloads option, an open previous project option, a logout option, and a start new project option. In response to selection of the start new project option, the user interface of FIG. 3C may be provided. The user interface of FIG. 3C includes a project title field for creating a user-defined title of the project. An associated project number will be automatically generated, assigned to and recorded as reference to this project. Also included are a media field, with an enter option and a back option. Specifically, the user may specify a location of a media file for which one or more tones may be included. The user may select a browse option to locate the file. Regardless, once the user specifies the content, the user may select the enter option. If the user desires to return to a previous user interface, the user may select the back option.

In response to selection of the enter option in FIG. 3C, the user interface of FIG. 3D may be provided. The user interface of FIG. 3D includes an auto option and a manual option. By selecting the auto option, one or more tones may be automatically generated and placed in a first graphical section of FIG. 3D. If the user selects the manual option, the user may specify the tone that is to be included with the content, as well as the location within that content that the tone will occur. As illustrated, a waveform of both the content and the tone may be depicted in the first graphical section. Also provided in FIG. 3D are a second tone option and a second graphical section. Specifically, the user may designate whether there are one or more tones being included with the content. If the user determines that there is more than one tone to be included with the content, the user may so designate in the second tone option. The user may then select a location of the second tone within the content. If a third tone (or more than three tones) is desired, options for including that tone may also be provided. When the user has completed designation and placement of the tone, the user may select a done option. If the user wishes to return to a previous user interface, the user may select a back option.

FIG. 3E depicts a user interface for the user to specify a message that the tone will instantiate. Upon the mobile computing device 102b (or other device) sensing play of the tone, the mobile computing device 102b may call an application or otherwise provide data to the user. The user interface of FIG. 3E may provide an option for the user to specify the data to be provided. Accordingly, the user interface of FIG. 3E provides a tone field for the user to specify logic, data, etc. for providing to the user upon detection of the tone. Also provided is an action option, which allows the user to specify whether to send the data (such as an offer) to the mobile computing device 102b immediately, send after a user defined number of hits, and/or to store the information in a database. A start and end data option is also provided, as well as similar options for other tones that have been utilized with the content. A done option and a back option are also provided.

It should be understood that some embodiments may provide other options for providing the data to the user. As an example, some embodiments may provide an option to only provide the data to the user when located at a predetermined geo-location. Other options may be to provide certain types of data (or notification) at one location and another type of data (or notification) at another location. This might be implemented such that when the consumer is located in a grocery store, a visible notification is provided with first data, but when the consumer is in an automobile, an audio alert is provided with second data. Depending on the particular embodiment, the first data may be a coupon for purchasing a product and the second data may simply be an audio advertisement.

The user interface of FIG. 3F may be provided in response to selection of the done option from FIG. 3E and indicates processing progress of the content. The user interface of FIG. 3G may be provided once the content has been processed and may provide a listing of downloads to be implemented. The user interface of FIG. 3G may include a project number field, a date field, a title field, and an international standardized commercial identifier (ISCI) field. A save as option, a return to main option, and a logout option are also provided. As will be understood, the user interface of FIG. 3G may also be reached in response to selection of the go to downloads option from FIG. 3B.

In response to selection of the open previous project option from FIG. 3B, the user interface of FIG. 3H may be provided. Similar to the user interface from FIG. 3G, the user interface of FIG. 3H includes a listing of project number, date, title, and ISCI code. The user may select one or more of the projects to view and/or edit details of the selected project. By doing so, the user may return to the user interface of FIG. 3D.

Figure 4:
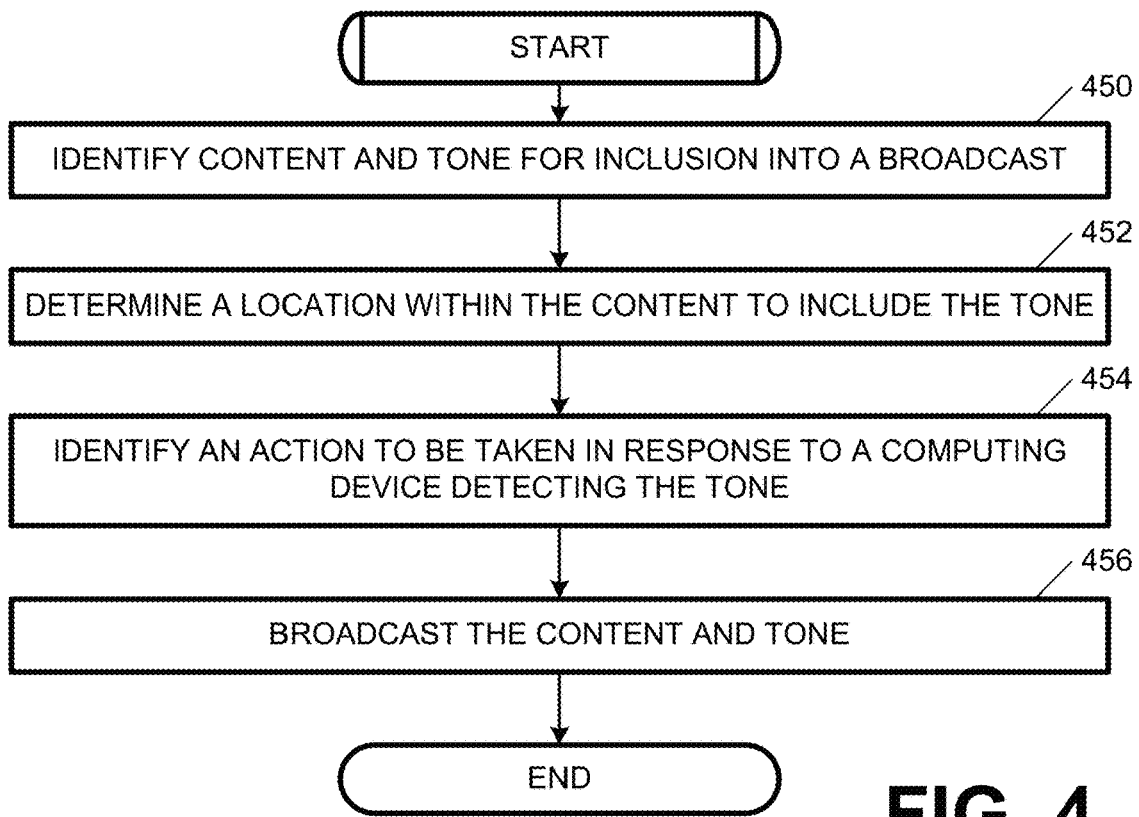
FIG. 4 depicts a flowchart for creating a tone for use in audio and/or video content, according to one or more embodiments described herein.

FIG. 4 depicts a flowchart for creating a tone for use in audio and/or video content, according to one or more embodiments described herein. As illustrated in block 450, content and a tone for inclusion into a broadcast are determined. Specifically, the content may include an internet radio broadcast (such as Pandora™, Spotify™, iHeartRadio™, etc.), a terrestrial radio broadcast (such as AM, FM, etc.), a satellite radio broadcast (such as XM™, Sirius™, etc.), internet video (such as Youtube.com™, Hulu.com™, Netflix.com™, etc.), terrestrial video (such as cable TV, satellite TV, over-the-air TV, etc.), and/or others. Additionally, a user may determine the data that will be included in the tone. As described above, the data may include an advertisement, information related to the content, information related to an environment in which the user is located, information related to the user, etc. Additionally, the embodiments may determine a coding scheme for converting the data into one or more tones. In block 452, a location within the content to include the tone may be determined. Specifically, the tone may be provided at the beginning of the content, at the end of the content, and/or during the content. As an example, if the content is a video and the video depicts a Coca-Cola™, the data may include information about Coca-Cola™, ways of purchasing the product, and/or other information, which may be provided concurrently with the image of the product. Similarly, if the content is a song, the data may include information about the artist, options for purchasing the song, etc. Once the data is converted into one or more tones, the tones may be broadcast with the content. Accordingly, a presentation device 106 may provide both the content and the data, which may be received by the user computing device 102a and/or mobile computing device 102b. In block 454, an action may be identified, where the action will be performed in response to a computing device detecting the tone. Specifically, the data may provide information related to the content, but may also include an action. The action may include an instruction for the recipient computing device 102 to launch a website, purchase a product, provide instructions for a user to find a product, etc. In block 456, the content and tone may be broadcast with the determined conditions.

Figure 5:
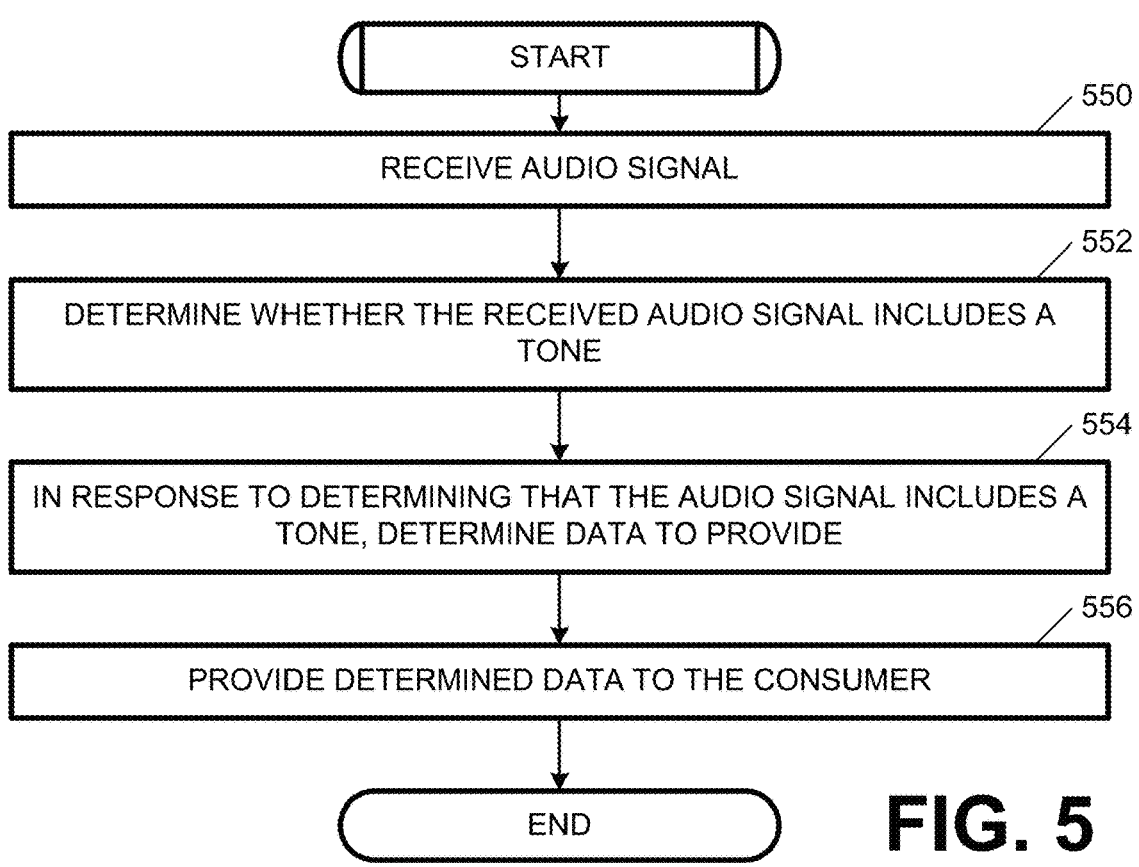
FIG. 5 depicts a flowchart for utilizing a tone in an audio and/or video content, according to one or more embodiments described herein.

FIG. 5 depicts a flowchart for utilizing a tone in an audio and/or video content, according to one or more embodiments described herein. In block 550, an audio signal may be received. As discussed above, the audio signal may include content and/or a tone. In block 552, a determination may be made regarding whether the received audio signal includes a tone. In block 554, in response to determining that the audio signal includes a tone, a determination may be made regarding data to provide. As discussed, this determination may be specified by the administrative user and may depend on the particular content, the location of the user, and/or other factors. As an example, recipient computing device 102 may determine that the data requests a website, an app, a widget, and/or other action to be taken on the recipient computing device 102. In block 556, the data may be provided to the consumer, based on the determined conditions. Accordingly, the website may be launched, and/or other actions may be taken.

It should be understood that other embodiments may be included within the scope of this disclosure and may be provided in the attached documents. The attached documents should be viewed as additional nonlimiting examples and embodiments that may be included with and/or substituted for embodiments described within the scope of this document.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for utilizing tones, comprising:
receiving, by a computing device, content for broadcast via a presentation device;
receiving, by the computing device, data for including with the content, wherein the data includes an instruction for a recipient computing device that receives the content broadcast by the presentation device to perform in response to detecting the data and wherein the data is provided based on a predetermined parameter associated with a consumer using the recipient computing device, the predetermined parameter being a geo-location of the recipient computing device;
converting, by the computing device, at least a portion of the data into an inaudible tone for inclusion with the content, wherein converting the at least a portion of the data includes encoding the at least a portion of the data into a binary pattern and converting the binary pattern into at least one pair of discrete frequencies that are inaudible to the consumer;
determining, by the computing device, a location within the content to include the inaudible tone;
incorporating, by the computing device, the inaudible tone into the content at the location, such that the inaudible tone and the content are broadcast to the recipient computing device;
providing, by the computing device to a user of the computing device, a user interface for the user of the computing device to specify a timing mechanism for the presentation device to broadcast the instruction with the content, wherein the user interface includes:
a first option for the user to specify whether the instruction is to be executed immediately with the content,
a second option for the user to specify whether the instruction is to be executed after a user-defined number of times that inaudible tones are received by the recipient computing device, and
a third user option to store the instruction with the content in a database; and
providing, by the computing device, the instruction for broadcast, according to the timing mechanism.

2. The method of claim 1, wherein the content includes at least one of the following: terrestrial radio, terrestrial television, satellite radio, satellite television, internet radio, and internet television.

3. The method of claim 1, wherein the location includes at least one of the following: around a beginning of the content, around an end of the content, and during the content.

4. The method of claim 1, wherein the instruction includes at least one of the following: an instruction for the recipient computing device to open a website, an instruction of the recipient computing device to launch an application, and an instruction for the recipient computing device to launch a widget.

5. The method of claim 1, wherein the predetermined parameter associated with the consumer is related to at least one of the following: a product in the content and a product of interest to the consumer.

6. The method of claim 1, further comprising the presentation device broadcasting the content and the inaudible tone.

7. A system for utilizing tones, comprising:
a recipient computing device that includes a processor and a memory component that stores logic that, when executed by the processor, causes the system to perform at least the following:
receive an audio signal from a presentation device that is broadcasting the audio signal, wherein the audio signal includes content;
determine whether the received audio signal includes a tone, wherein the tone was created via a remote computing device by encoding data into a binary pattern and converting the binary pattern into at least one pair of discrete frequencies that are inaudible to a consumer using the recipient computing device;
in response to determining that the audio signal includes a tone, determine data provided in the tone, wherein the data is provided based on a predetermined parameter associated with the consumer, the predetermined parameter being a geo-location of the recipient computing device; and
utilize the data to perform an action, wherein the action includes at least one of the following: launch an application, launch a website, and launch a widget,
wherein the remote computing device performs at least the following:
receive the content for broadcast to the recipient computing device via the presentation device;
provide a user interface that provides a graphical representation of the content, an auto option, and a manual option, wherein in response to selection of the manual option, an option for the user to graphically select a point in the content for inserting the tone, wherein in response to selection of the auto option, the remote computing device determines an appropriate point in the content for inserting the tone;
receive the data for including with the content, wherein the data includes an instruction for the recipient computing device to perform in response to detecting the data;
convert the data into the tone for inclusion with the content;
determine a location within the content to include the tone, based on information provided in the user interface;
incorporate the tone into the content at the location, such that the tone and the content are broadcast to the recipient computing device; and
provide a different user interface for specifying a timing mechanism to broadcast the data with the content, wherein the user interface includes:
a first option for the user to specify whether the instruction is to be executed immediately with the content, causing the data to be accessible, by the recipient computing device immediately with the content immediately,
a second option for the user to specify whether the instruction is to be executed after a user-defined number of times that inaudible tones are received by the computing device, the data being accessible, by the recipient computing device, based on the user-defined number of times that the inaudible tones are received by the computing device, and
a third user option to store the data with the content in a database.

8. The system of claim 7, wherein the content includes at least one of the following: terrestrial radio, terrestrial television, satellite radio, satellite television, internet radio, and internet television.

9. The system of claim 7, wherein the tone is detected around at least one of the following: a beginning of the content, an end of the content, and during the content.

10. The system of claim 7, wherein the predetermined parameter associated with the consumer using the recipient computing device is related to at least one of the following: a product in the content and a product of interest to the consumer.

11. The system of claim 7, further comprising sending data related to the action to a remote computing device.

12. The system of claim 11, wherein data related to the action includes at least one of the following: a purchase made by the consumer, a location of the consumer, and other content viewed by the consumer.

13. A non-transitory computer-readable medium for utilizing tones that stores logic that, when executed by a computing device, causes the computing device to perform at least the following:
receive content for broadcast via a presentation device to a recipient computing device;
receive data for including with the content, wherein the data includes an instruction for the recipient computing device to perform in response to detecting the data and wherein the data is provided based on a predetermined parameter associated with a consumer using the recipient computing device, the predetermined parameter being a geo-location of the recipient computing device;
convert at least a portion of the data into a tone for inclusion with the content, wherein converting the at least a portion of the data includes encoding the at least a portion of the data into a binary pattern and converting the binary pattern into at least one pair of discrete frequencies that are inaudible to the consumer;
determine a location within the content to include the tone;
incorporate the tone into the content at the location, such that the tone and the content are broadcast to the recipient computing device by the presentation device;
provide a user interface for a user to specify a timing mechanism to broadcast the instruction with the content, wherein the user interface includes:
a first option for the user to specify whether the instruction is to be executed immediately with the content,
a second option for the user to specify whether the instruction is to be executed after a user-defined number of times that inaudible tones are received by the recipient computing device, and
a third user option to store the instruction with the content in a database; and
provide the instruction and the content for broadcast, according to the timing mechanism.

14. The non-transitory computer-readable medium of claim 13, wherein the content includes at least one of the following: terrestrial radio, terrestrial television, satellite radio, satellite television, internet radio, and internet television.

15. The non-transitory computer-readable medium of claim 13, wherein the location includes at least one of the following: around a beginning of the content, around an end of the content, and during the content.

16. The non-transitory computer-readable medium of claim 13, wherein the instruction includes at least one of the following: an instruction for the recipient computing device to open a website, an instruction of the recipient computing device to launch an application, and an instruction for the recipient computing device to launch a widget.

17. The non-transitory computer-readable medium of claim 13, wherein the predetermined parameter associated with the consumer is related to at least one of the following: a product in the content and a product of interest to the consumer.

18. The method of claim 1, wherein converting the data into an inaudible tone by encoding the data into a binary pattern comprises the step of including an error-detection mechanism for indicating an error in detecting the data by the recipient computing device.

19. The system of claim 7, wherein the remote computing device includes an error-detection mechanism in the data when the data is converted into the tone, the error-detection mechanism configured to indicate an error in detecting the data by the recipient computing device.

20. The non-transitory computer-readable medium of claim 13, wherein converting the data into an inaudible tone by encoding the data into a binary pattern comprises the step of including an error-detection mechanism for indicating an error in detecting the data by the recipient computing device.

* * * * *